United States Patent

[11] 3,589,312

| [72] | Inventor | Milton V. Cooper<br>5540 N. W. 23 Apt. 144, Oklahoma City, Okla. 73127 |
|---|---|---|
| [21] | Appl. No. | 847,236 |
| [22] | Filed | Aug. 4, 1969 |
| [45] | Patented | June 29, 1971 |

[54] PORTABLE APPARATUS FOR IGNITING CHARCOAL AND THE LIKE
3 Claims, 4 Drawing Figs.

[52] U.S. Cl. .................................................. 110/1 F, 126/25 B
[51] Int. Cl. .................................................. F23b 3/00
[50] Field of Search .................................................. 110/1; 126/25

[56] References Cited
UNITED STATES PATENTS

| 3,339,505 | 9/1967 | Bean .......................... | 110/1 |
| 3,410,261 | 11/1968 | Cooper et al. ................. | 126/25 |

FOREIGN PATENTS

| 82,351 | 1/1935 | Sweden ....................... | 126/25 |

*Primary Examiner*—Edward G. Favors
*Attorney*—Dunlap, Laney, Hessin and Dougherty ABSTRACT: The present invention relates to portable apparatus for igniting charcoal and the like comprising an elongated rigid conduit having a forward end for discharging ignition fuel therefrom and a rearward end. A source of ignition fuel is connected to the rearward end of the conduit, and a dish-shaped member is attached to the forward end of the conduit positioned so that ignition fuel discharged from the conduit is directed downwardly toward a point near the periphery of the concave surface thereof. The dish-shaped member serves to deflect heat and flames from the combustion of the ignition fuel upwardly and outwardly, and may be used to shift charcoal and the like from one position to another before, during and after the ignition thereof.

PATENTED JUN29 1971 3,589,312

INVENTOR
MILTON V. COOPER

BY
Dunlap, Camy, Hessin & Dougherty
ATTORNEYS

PORTABLE APPARATUS FOR IGNITING CHARCOAL AND THE LIKE

BACKGROUND OF THE INVENTION

1. Field of the Invention

The present invention relates generally to portable apparatus for igniting charcoal and the like, and more particularly, but not by way of limitation, to portable apparatus for igniting charcoal and the like with flammable gas stored in a canister under pressure.

2. Description of the Prior Art

The most commonly used method of igniting charcoal used in conventional barbecue grilling apparatus of the portable variety involves pouring a flammable liquid over the charcoal and igniting the liquid with a match or other means. This procedure is both dangerous and inconvenient in that it is normally necessary to repeatedly add additional quantities of the flammable liquid to the charcoal in order to achieve the complete ignition thereof. When such flammable liquid is poured over partially ignited charcoal it is vaporized by the heat present in the charcoal often causing flash fires or minor explosions which endanger the operator of the apparatus.

In order to overcome this problem, various types of portable apparatus have been developed for igniting charcoal in conventional barbecue grill apparatus. The most popular of these devices employ electrical energy for generating the ignition heat, and are not truly portable in that they must be plugged into an electrical outlet. This is often inconvenient in that barbecue grilling apparatus of the portable variety are normally used in the open and electrical outlets are not always available near by. Additionally, complete ignition of charcoal and the like using such electrical devices often requires a relatively long time to achieve.

Apparatus has been developed for igniting charcoal and the like with a continuous source of fuel gas, but these devices must be installed on the grilling apparatus or in a fire place, and are not portable. By the present invention portable apparatus for igniting charcoal and the like with a continuous source of fuel gas is provided which is self-contained, easily moved from place to place, and which provides maximum safety to the operator thereof.

SUMMARY OF THE INVENTION

The present invention relates to portable apparatus for igniting charcoal and the like which comprises an elongated rigid conduit having a forward end for discharging ignition fuel therefrom and a rearward end, a source of ignition fuel connected to the rearward end of said conduit, and a dish-shaped member attached to the forward end of said conduit having the concave surface thereof positioned adjacent to the forward end of said conduit.

It is, therefore, a general object of the present invention to provide portable apparatus for igniting charcoal and the like.

A further object of the present invention is the provision of portable apparatus for igniting charcoal and the like with a continuous source of ignition fuel gas which is self-contained and easily moved from place to place.

Yet a further object of the present invention is the provision of a portable apparatus for igniting charcoal which may be conveniently used for shifting the charcoal before, during and after it is ignited.

Still a further object of the present invention is the provision of a portable device for igniting charcoal and the like with a continuous source of ignition fuel which is relatively simple to operate and which provides maximum safety to the operator thereof.

Other objects and advantages of the invention will be evident from the following detailed description when read in conjunction with the accompanying drawings which illustrate the invention.

DESCRIPTION OF THE PREFERRED EMBODIMENTS

Figure 1:
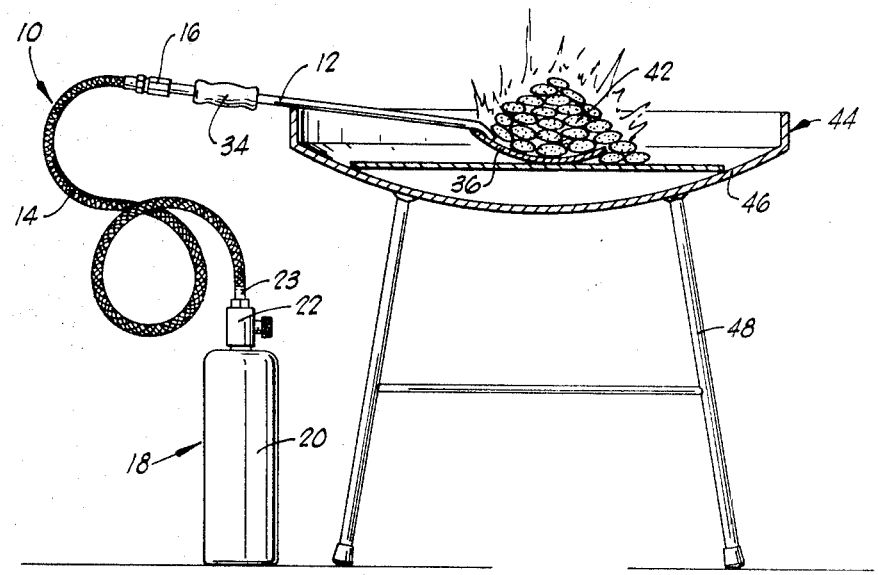
FIG. 1 is a side view of the overall apparatus of the present invention being used to ignite charcoal in an exemplary conventional barbecue grilling apparatus shown in section.

Referring now to the drawings, and particularly to FIG. 1, the apparatus of the present invention is generally designated by the numeral 10. The apparatus 10 basically comprises an ignition fuel burner and charcoal handling device 12 connected to a section of heat-resistant and nonheat conductive flexible hose 14 by a conventional connector 16. The flexible hose 14 is in turn connected to an ignition fuel source 18. The flexible hose 14 may be formed from woven asbestos, and may include additional reinforcing and plasticizing materials to insure its heat resistance and gas sealing qualities.

The fuel source 18 consists of a bottle or canister 20 containing a compressed or liquefied gas within the interior thereof. The gas is preferably propane or other of the well-known flammable gases which are suitable for safe economical disposition under pressure.

A conventional valve 22 for manually controlling the flow of gas from the canister 20, and for reducing the pressure of the gas as it passes therethrough is attached to the canister 20 in a conventional manner. The flexible hose 14 is threadedly connected to the valve 22 by a threaded male fitting 23 which is bonded to the hose 14.

Figure 2:
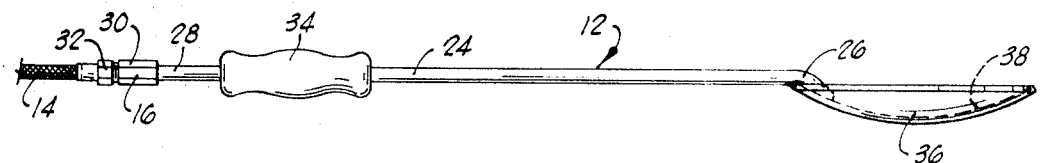
FIG. 2 is an enlarged side view of a portion of the apparatus of the present invention shown in FIG. 1.
Figure 4:
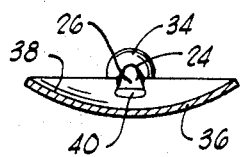
FIG. 4 is a view taken along line 4—4 of FIG. 3.
Figure 3:
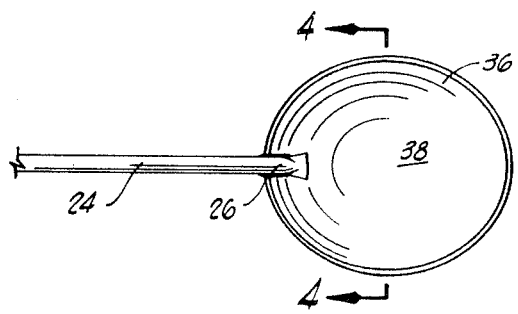
FIG. 3 is a top view of a portion of the apparatus shown in FIG. 2.

Referring particularly to FIGS. 2 through 4, the ignition fuel burner and handling device 12 is illustrated in detail. The device 12 basically comprises an elongated rigid conduit 24 having a forward end 26 and a rearward end 28. The conduit 24 is preferably formed of corrosion and fire resistant metal, such as a length of stainless steel tubing. The conventional connector 16 comprises a threaded female fitting 30 which is brazed or otherwise joined to the rearward end 28 of the conduit 24. A threaded male fitting 32 which is bonded to the flexible hose 14 is threadedly joined to the female fitting 30. A handle 34, formed of a heat insulating material such as wood, is attached to the conduit 24 near the rearward end 28 thereof.

A dish-shaped member 36, preferably formed of a metallic material which is fire and corrosion resistant, such as stainless steel, is attached to the forward end 26 of the conduit 24 in a convenient manner such as by brazing. The dish-shaped member 36 is positioned with the concave surface 38 thereof adjacent to the forward end 26 of the conduit 24. As shown best in FIG. 2, the forward end 26 of conduit 24 is bent at an angle complimenting the concave surface 38 of the dish-shaped member 36, and extends within the dish-shaped member 36 a short distance terminating at a point near the periphery thereof. Additionally, as best shown in FIG. 4, the forward end 26 of conduit 24 may be flattened so that the fuel discharge opening 40 therein is formed in the shape of an ellipse with the longest axis thereof lying in a plane parallel to a plane intersected by the peripheral edges of the dish-shaped member 36.

OPERATION

As illustrated in FIG. 1, the portable apparatus 10 may be used to ignite a quantity of charcoal 42 disposed in a conventional grilling apparatus 44. As will be understood, the grilling apparatus 44 is exemplary of any of a variety of commercially available grilling apparatus, and consists of a brasier portion 46 supported by a plurality of legs 48. In igniting the quantity of charcoal 42 using the portable apparatus 10, the ignition gas canister 20 is placed on the floor near the grilling apparatus 44. Since the flexible hose 14 is heat resistant and non-heat conductive, the canister is insulated from heat generated by the combustion of the ignition fuel and charcoal in the grilling apparatus 44. The fuel burner and charcoal handling device 12 may be grasped by the handle 34 and used by the operator in a manner similar to the use of a spoon to place the charcoal in a pile. Fuel is then caused to pass through the flexible hose 14 and device 12 by manually opening the valve 22 attached to the canister 20. The fuel passing through the device 12 is discharged from the opening 40 in the forward end 26 of conduit 24, and may be ignited in a conventional manner such as by a match or other means. In igniting the ignition fuel, the valve 22 may be adjusted so that only a small volume of fuel is discharged from the device 12. The ignition fuel may then be ignited with a maximum of safety. After the ignition fuel has been ignited, the dish-shaped member 36 of the device 12 may be inserted under a portion of the pile of charcoal 42 and the volume of ignition fuel increased by opening the valve 22 further. The heat and flames from the combustion of the ignition fuel pass upwardly through the charcoal 42 causing it to become ignited. After ignition of the charcoal, the device 12 may be grasped by the handle 34 and again used in a manner similar to a spoon to shift or spread the ignited charcoal 42 uniformly within the brasier portion 46 of the grilling apparatus 44. As will be understood by those skilled in the art, the heat insulating handle 34 prevents heat conducted by the conduit 24 from reaching the hand of the operator.

As described above the forward end 26 of the conduit 24, is bent at an angle complimenting the concave surface of the dish-shaped member 36. This causes the ignition fuel discharged from the conduit 24 to be directed downwardly or tangentially towards a point near the periphery of the concave surface 38 of the dish-shaped member 36. The concave surface 38 in turn causes the fuel to be directed upwardly and outwardly in a direction away from the conduit 24. Also, as described above, the forward end 26 of the conduit 24 is flattened so that the opening 40 therein is formed in the shape of an ellipse. The elliptical shape of the opening 40 causes the fuel passing therethrough to be spread laterally over the concave surface 38 of the dish-shaped member 36. Thus, after the ignition fuel passing from conduit 24 is ignited and the volume thereof increased, the flames and heat resulting therefrom are spread out and directed upwardly and outwardly from the dish-shaped member 36. As a result, the dish-shaped member 36 may be placed under a portion of the pile of charcoal 42 and the heat and flames from the combustion of the ignition fuel will be continuously distributed outwardly and upwardly through the pile of charcoal 42 thereby causing it to be uniformly ignited.

The portable ignition apparatus 10 of the present invention may be used for carrying out a variety of operations in addition to the ignition of charcoal. For example, the apparatus 10 may be used for igniting firewood placed in a fireplace by simply placing the dish-shaped member 36 of the device 12 under the firewood to be ignited. The flames and heat from the combustion of the ignition fuel will be directed upwardly and outwardly towards the firewood thereby causing it to be ignited. Many other operations may be carried out using the portable apparatus of the present invention which are too numerous to list herein, but which will suggest themselves to those using the apparatus.

Thus, the present invention is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention disclosed herein.

What I claim is:

1. Portable apparatus for igniting charcoal and the like, which comprises:
    an elongated rigid conduit having a forward end for discharging ignition fuel therefrom and a rearward end;
    a source of ignition fuel connected to the rearward end of said conduit, comprising:
        a canister containing flammable gas under pressure;
        a valve attached to said canister for controlling the flow of gas therefrom; and
        a selected length of flexible tubing connected between said valve and the rearward end of said conduit; and
    a dish-shaped member attached to the forward end of said conduit having the concave surface thereof positioned adjacent to the forward end of said conduit, wherein said dish-shaped member is positioned so that ignition fuel discharged from the forward end of the conduit is directed tangentially towards a point near the periphery of the concave surface thereof.

2. The apparatus of claim 1 wherein the forward end of said conduit is formed in a shape such that the discharge opening therein causes the ignition fuel discharged therefrom to be spread laterally over the concave surface of said dish-shaped member.

3. The apparatus of claim 2 which is further characterized to include a handle formed of heat insulating material attached to said conduit near the rearward end thereof.